Nov. 13, 1923.
E. W. BREISCH
RECTIFIER
Filed Nov. 5, 1920
1,473,807
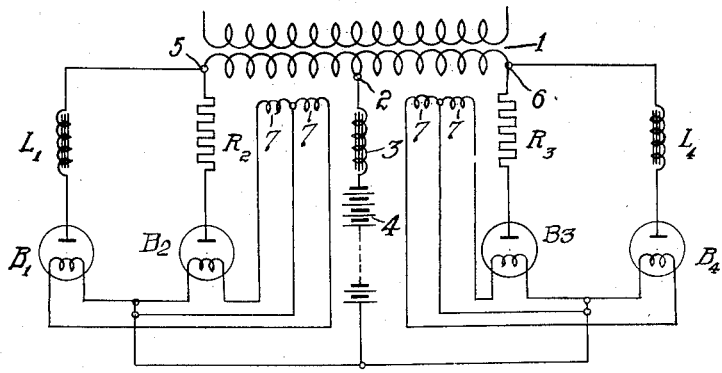
Fig. 1.
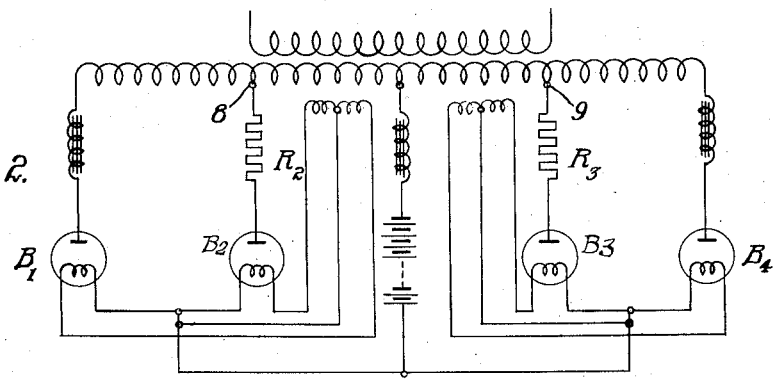
Fig. 2.
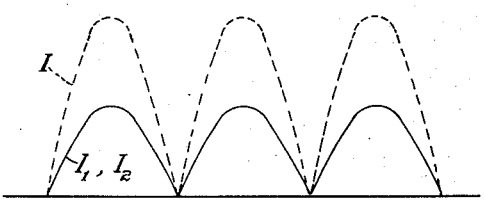
Fig. 3.
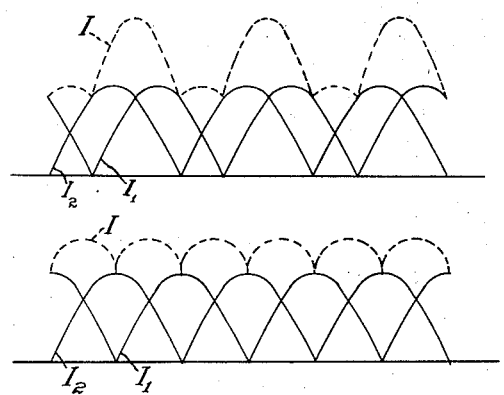
Fig. 4.
Fig. 5.
WITNESSES:
H. T. Shelhamer
O. B. Buchanan
INVENTOR
Edgar W. Breisch
BY
Wesley G. Carr
ATTORNEY Patented Nov. 13, 1923.

1,473,807

UNITED STATES PATENT OFFICE.

EDGAR W. BREISCH, OF EDGEWOOD, PENNSYLVANIA, ASSIGNOR TO WESTINGHOUSE ELECTRIC & MANUFACTURING COMPANY, A CORPORATION OF PENNSYLVANIA.

RECTIFIER.

Application filed November 5, 1920. Serial No. 422,018.

*To all whom it may concern:*

Be it known that I, EDGAR W. BREISCH, a citizen of the Un ted States, and a resident of Edgewood, in the county of Allegheny and State of Pennsylvania, have invented a new and useful Improvement in Rectifiers, of which the following is a specification.

This invention relates to rectifiers and particularly to means for smoothing out the direct current pulsations when a single-phase source of supply is employed.

The rectifiers used for battery charging and telephone stations must, at the present time, be supplied with quite a large inductance in the direct current leads in order to reduce the ripple of the charging current so that the noise in the telephone circuits will not be too great. As an inductance of sufficient size is expensive, it is desirable to avoid its use, if possible.

The principal object of my invention, therefore, is to provide means for the partial elimination of the sustaining coil in connection w th rectifiers.

My invent on will be understood by reference to the accompanying drawings wherein—

Figure 1 shows schematically an embodiment of my invention using four bulbs;

Fig. 2 is a similar view of a modification of the device shown in Fig. 1; and

Figs. 3, 4 and 5 are current diagrams.

Referring to the drawings, I show a transformer 1 of the usual construction, which may be either of the two-winding type or the auto type. The secondary winding of the transformer is provided with a midpoint 2 which is connected through a sustaining coil 3 to the negative terminal of a battery 4, the positive terminal of which is connected to the cathodes of four bulbs, $B_1$, $B_2$, $B_3$ and $B_4$.

These bulbs are connected in pairs, the bulbs $B_1$ and $B_2$ having their anodes connected, respectively, through inductance $L_1$ and resistance $R_2$ to a secondary terminal 5 of the transformer, while bulbs $B_3$ and $B_4$ have their anodes connected, respectively, through resistance $R_3$ and inductance $L_4$ to a secondary terminal 6. The filaments of the bulbs are energized by any suitable means, such as transformer windings 7, which may be in inductive relation to the primary winding of the main transformer, if desired.

The effect of this arrangement is clearly shown in Figs. 3, 4 and 5. In each of these figures the curve $I_1$ represents the current in the bulb $B_1$; the curve $I_2$ represents the current in bulb $B_2$ and the dotted curve $I$ represents the resultant or load current.

Fig. 3 illustrates the case in which the resistances $R_2$ and $R_3$, and choke coils $L_1$ and $L_4$ are omitted.

Fig. 4 represents the case in which there is a 60° lag between the current in choke coil $L_1$ and the current in the resistance $R_2$.

Fig. 5 represents the case in which there is a 90° lag between said currents, and represents the case of maximum smoothness, with only two bulbs in parallel. The marked reduction in the irregularities of the load current obtained by my device is clearly shown.

My invention is obviously applicable to other forms of rectifiers, such as asymmetrical electrolytic cells or vapor rectifiers. It is obvious, also, that the number of phases may be multiplied indefinitely by the use of a sufficiently large number of bulbs connected in parallel. Moreover, while the phase displacement is obtained in Fig. 1 by means of inductances and resistances, only, I contemplate the use also of capacitive inductances as well.

Fig. 2 shows one embodiment of my invention in which the bulbs $B_1$ and $B_2$ are connected, respectively, to taps 8 and 9 on the secondary winding intermediate the ends thereof, the bulbs $B_1$ and $B_4$ being connected to the respective ends of the secondary windings. In this manner, the resistances $R_2$ and $R_3$ may be reduced or even eliminated, by reason of the lower transformer voltage applied to the corresponding bulbs $B_2$ and $B_3$.

While the sustaining coil 3 is shown in both Figures 1, and 2, it is obvious that the size of this coil may be very materially reduced, and if a sufficient number of phases are used it may even be eliminated altogether.

While I have illustrated my invention in its preferred forms, it is to be understood that it is susceptible of various modifications by those skilled in the art and that the claims are to be construed to cover all such modifications except where limited by the state of the art.

I claim as my invention:—

1. The combination with a single phase source of alternating current, of a pair of asymmetrical conductors connected in parallel therewith, a reactance device in series with one of said asymmetrical conductors, and means for impressing upon said last mentioned asymmetrical conductor and said reactance device a higher alternating current voltage than that impressed upon the other asymmetrical conductor.

2. The combination with a single-phase line, of transformer means for deriving therefrom a plurality of winding elements of different potentials, a plurality of means for rectifying both half-waves of said winding elements, respectively, a direct-current translating device, means for connecting said rectifying means in parallel to said translating device, and impedance means for causing a phase displacement between the currents in said rectifying means, said impedance means and different potentials being so related that the potential-drops in said impedances is substantially equal to the corresponding differences in potential of said winding elements during normal load conditions.

In testimony whereof I have hereunto subscribed my name this 27th day of October, 1920.

EDGAR W. BREISCH.